United States Patent
Zagrodnik (10) Patent No.: US 11,936,018 B2
(45) Date of Patent: Mar. 19, 2024

(54) BATTERY THERMAL REGULATING UNIT

(71) Applicant: Rolls-Royce plc, London (GB)

(72) Inventor: Michael A. Zagrodnik, Derby (GB)

(73) Assignee: ROLLS-ROYCE PLC, London (GB)

( * ) Notice: Subject to any disclaimer, the term of this patent is extended or adjusted under 35 U.S.C. 154(b) by 588 days.

(21) Appl. No.: 17/079,940

(22) Filed: Oct. 26, 2020

(65) Prior Publication Data

US 2021/0143492 A1 May 13, 2021

(30) Foreign Application Priority Data

Nov. 13, 2019 (GB) ...................................... 1916484

(51) Int. Cl.
*H01M 10/625* (2014.01)
*B60L 50/60* (2019.01)
(Continued)

(52) U.S. Cl.
CPC ........... *H01M 10/625* (2015.04); *B60L 50/60* (2019.02); *B60L 58/26* (2019.02); *B60L 58/27* (2019.02); *B64D 27/24* (2013.01); *H01M 10/613* (2015.04); *H01M 10/647* (2015.04); *H01M 10/6568* (2015.04); *H01M 50/20* (2021.01);
(Continued)

(58) Field of Classification Search
CPC ............. H01M 10/513; H01M 10/625; H01M 10/647; H01M 10/6568; B60L 58/26
See application file for complete search history.

(56) References Cited

U.S. PATENT DOCUMENTS

| | | | |
|---|---|---|---|
| 2005/0089750 A1* | 4/2005 | Ng | H01M 10/6557 429/62 |
| 2013/0171491 A1* | 7/2013 | Wei | H01M 10/6555 165/47 |

(Continued)

FOREIGN PATENT DOCUMENTS

| | | |
|---|---|---|
| DE | 10 2012 218 724 A1 | 4/2014 |
| WO | 2017188865 A1 | 11/2017 |

(Continued)

OTHER PUBLICATIONS

Mar. 31, 2021 extended Search Report issued in European Patent Application No. 20206079.4.

*Primary Examiner* — Jonathan G Jelsma
(74) *Attorney, Agent, or Firm* — Oliff PLC (57) ABSTRACT

A thermal regulating unit for regulating the temperature of a pouch cell battery is provided. The thermal regulating unit is formed as a container having: one or more internal cooling channels for conveying a liquid coolant through the unit; a flexible outer covering which contains the cooling channels; and inlet and outlet ports which penetrate the covering for respectively providing liquid coolant to and removing the liquid coolant from the cooling channels. The flexible outer covering forms a substantially flat major external surface of the unit corresponding in shape to, and for pressing against, a major external surface of the pouch cell battery such that the unit and the pouch cell battery can be held in face-to-face contact. The cooling channels are arranged in the flexible outer covering such that when the provided liquid coolant is pressurized it causes the unit to expand and press against the major external surface of the pouch cell battery.

17 Claims, 6 Drawing Sheets

(51) Int. Cl.
    *B60L 58/26*          (2019.01)
    *B60L 58/27*          (2019.01)
    *B64D 27/24*         (2006.01)
    *H01M 10/613*       (2014.01)
    *H01M 10/647*       (2014.01)
    *H01M 10/6568*     (2014.01)
    *H01M 50/20*        (2021.01)
    *H01M 50/24*        (2021.01)

(52) U.S. Cl.
    CPC ......... *H01M 50/24* (2021.01); *B60L 2200/10* (2013.01); *B64D 2221/00* (2013.01); *H01M 2220/20* (2013.01)

(56) References Cited

U.S. PATENT DOCUMENTS

| | | | |
|---|---|---|---|
| 2013/0171493 A1 | 7/2013 | Wayne et al. | |
| 2015/0200429 A1 | 7/2015 | Lee et al. | |
| 2018/0076493 A1* | 3/2018 | Park | H01M 50/236 |
| 2018/0269547 A1* | 9/2018 | Robert | H01M 10/6554 |
| 2018/0301774 A1* | 10/2018 | Campeau | H10N 10/13 |
| 2019/0118610 A1* | 4/2019 | Johnston | B60L 58/26 |
| 2021/0139154 A1* | 5/2021 | Klonowski | B64D 35/04 |

FOREIGN PATENT DOCUMENTS

| | | | | |
|---|---|---|---|---|
| WO | 2019/123903 A1 | 6/2019 | | |
| WO | WO-2021019495 A1 * | 2/2021 | | |
| WO | WO-2021059206 A1 * | 4/2021 | ......... | B01D 53/0407 |

* cited by examiner

BATTERY THERMAL REGULATING UNIT

CROSS-REFERENCE TO RELATED APPLICATIONS

This specification is based upon and claims the benefit of priority from United Kingdom Patent Application Number 1916484.7, filed on 13 Nov. 2019, the entire contents of which are incorporated herein by reference.

FIELD OF THE DISCLOSURE

The present disclosure relates to a thermal regulating unit for a pouch cell battery.

BACKGROUND

The performance requirements placed upon batteries used in land-based electric vehicles and the regulatory requirements governing this class of product have given rise to battery modules based on pouch cell batteries designed specifically for the land-based electric vehicle market. However, these designs are generally unsuitable for aerospace applications, particularly electric and hybrid electric propulsion systems, where the operating environment, load profile and regulatory environment are quite different.

In particular, aerospace applications present the following technical challenges:

1) High discharge rates. High discharge currents are drawn from the battery particularly during takeoff and landing. The high currents give rise to internal cell heating and potentially high cell temperatures and/or temperature gradients within the cell which consequently reduce the cell cycle life. A technical challenge is to provide adequate cooling to the cell, maintaining a uniform temperature throughout the body of the cell within the optimum range of between 10 and 35° C.

2) High altitude operation. The battery module may be required to operate at altitudes of for example 30,000 ft or more (9 km or more). The reduced air pressure/density lowers the insulation properties of air, making it problematic to provide adequate isolation without incurring excessive weight/size penalty. Moreover, pouch cell batteries operating in a low pressure or vacuum environment may undergo expansion and contraction cycling. This may lead to electrode damage and premature loss discharge capacity. To address this it may be necessary to apply a restraining pressure to the electrode stack. This has been demonstrated to reduce capacity degradation even under near vacuum (0.1 psi, about 0.7 kPa) conditions.

3) Vibration and mechanical stress. The aircraft environment is characterized by high vibration, accelerations in both vertical and horizontal directions and orientation changes (pitch and roll). A support structure may thus be needed that can support the cells in any orientation and dampen vibrations which lead to material fatigue.

4) Thermal runaway containment. While the incidence of thermal runaway can be reduced by appropriate cell selection, thermal management and protection algorithms employed by the battery management system, it is nonetheless possible that a thermal runaway event may still occur. RTCA DO-311A 2.4.5.5 'Battery Thermal Runaway Containment Test' examines the performance of the module when multiple cells are forced into thermal runaway. The pass criterion for this test is that no smoke or debris be released from the module. One technical challenge is to contain a fire so that thermal runaway of one cell does not propagate to another. A second technical challenge is to prevent escape of smoke or debris from a battery module.

5) Explosion containment. In the event of cell venting, it is possible that the air spaces within a module become filled with electrolyte vapour. This vapour may explode if an ignition source is present. RTCA DO-311A 2.4.5.6 'Explosion Containment Test' examines the performance of a battery module under such an event and specifies that no smoke or debris shall be permitted to exit from the module. A technical challenge is thus to configure a lightweight casing for a module that is able to withstand such an explosion.

SUMMARY

Aspects of the present disclosure aim to address these challenges.

A first general aspect of the present disclosure provides a thermal regulating unit for regulating the temperature of a pouch cell battery, the thermal regulating unit having: one or more internal cooling channels for conveying a liquid coolant through the unit; and inlet and outlet ports for conveying liquid coolant respectively to and from the one or more cooling channels; wherein the unit has a substantially flat major external surface for pressing against a major external surface of the pouch cell battery such that the unit and the pouch cell battery can be held in face-to-face contact.

The thermal regulating unit can thus keep the battery cool, allowing high discharge currents to be drawn from the battery, while also exerting a pressure on the battery which helps it to operate at high altitudes. In addition, the pressing of the thermal regulating unit against the battery can provide mechanical support and help to reduce vibrations.

More particularly, according to a second aspect of the present disclosure there is provided a thermal regulating unit for regulating the temperature of a pouch cell battery, the thermal regulating unit being formed as a container having: one or more internal cooling channels for conveying a liquid coolant through the unit; a flexible outer covering which contains the cooling channels; and inlet and outlet ports which penetrate the covering for respectively providing liquid coolant to and removing the liquid coolant from the cooling channels; wherein the flexible outer covering forms a substantially flat major external surface of the unit for pressing against, a major external surface of the pouch cell battery such that the unit and the pouch cell battery can be held in face-to-face contact; and wherein the cooling channels are arranged in the flexible outer covering such that when the provided liquid coolant is pressurized it causes the unit to expand and press against the major external surface of the pouch cell battery.

For example, the flexible outer covering of the unit may be formed of a plastic material having a thermal conductivity of at least 0.2 W/mK. For example, it may be formed of polypropylene, polyethylene, nylon, or some other polymer resistant to the liquid coolant.

Advantageously, the flexible outer covering allows the liquid coolant to be a means by which the thermal regulating unit can both cool the battery and exert a pressure on the battery.

Optional features and further aspects of the present disclosure are now set out.

The pouch cell battery may be a lithium ion pouch cell battery.

The liquid coolant may be water or water-glycol (e.g. a 50:50 mixture).

The substantially flat major external surface of the thermal regulating unit may correspond in shape to the major external surface of the pouch cell battery. The major external surface of the thermal regulating unit of the first or second aspect may be rectangular, i.e. corresponding in shape to, and for pressing against, a rectangular major external surface of the pouch cell battery. Thus conveniently the unit can have a prismatic 3D shape, matching a rectangular prismatic 3D shape of the pouch cell battery.

The cooling channels may follow a serpentine path from the inlet port to the outlet port. The path can thereby allow the channels to cover an area substantially matching that of the major external surface of the unit.

The unit may further contain a spacer element which limits the expansion of the unit. For example, the spacer element may be a body (e.g. of rectangular prismatic 3D shape) which substantially completely fills the unit, the cooling channels being formed as cut-outs through or recesses in the body. The body can be formed from a plastic such as polypropylene, polyethylene, nylon, or some other polymer resistant to the liquid coolant.

According to a third aspect of the present disclosure there is provided a battery module having: plural thermal regulating units according to the first or second aspect; and plural electrically connected pouch cell batteries, each cell battery having a major external surface corresponding in shape to the major external surface of a respective one of the units; wherein each pouch cell battery forms a battery/unit combination with the respective unit such that the major external surfaces of the battery and the unit are in face-to-face contact.

Conveniently each battery/unit combination may be contained in a respective restraining jacket formed of non-combustible material. The jacket thus provides a non-combustible thermal barrier around the battery. However, it also helps to mechanically protect the battery and unit and keep them in close contact.

Indeed, more generally, in a fourth aspect of the present disclosure there is provided a battery/unit combination of the thermal regulating unit according to the first or second aspect, and a pouch cell battery having a major external surface corresponding in shape to the major external surface of the unit, the battery/unit combination being contained in a restraining jacket formed of non-combustible material with the major external surface of the unit in face-to-face contact with the major external surface of the pouch cell battery.

In the third or fourth aspect, the restraining jacket can be a flexible restraining jacket. For example, the non-combustible material can be an inorganic fibre material, such as a felt or a woven fibre material. The fibres can be alumina-silicate ceramic fibres.

In the battery module of the third aspect, the battery/unit combinations may be arranged within a casing, spaces within the casing surrounding the battery/unit combinations being filled with flame-retardant and electrically-insulating expanded foam. The foam can then also apply pressure to the battery/unit combinations to further reinforce the face-to-face contact between the unit and the battery of each combination. However, the battery module may retain or comprise a void (i.e. a space not filled with expanded foam) for collection of gas and smoke from the batteries in the event of thermal runaway of one or more of the batteries, and for channeling the collected gas and smoke to a burst valve located in the casing.

In the battery module of the third aspect, the casing may have a distribution port penetrating therethough which is fluidly connected to the inlet ports of the thermal regulating units, and a collection port penetrating therethough which is fluidly connected to the outlet ports of the thermal regulating units. The liquid coolant can then enter and leave the casing via respectively the distribution and collection ports.

According to a fifth aspect of the present disclosure, there is provided a combination of the battery module according to the third aspect in which the casing has the distribution and collection ports, and a coolant circuit, wherein the coolant circuit has a pump to pump the liquid coolant from the collection port back to the distribution port via a heat exchanger (such as a fan-assisted radiator) to reduce the temperature of the pumped liquid coolant and thereby remove waste heat from the battery module.

The coolant circuit of the fifth aspect can also provide an option to warm the batteries. In particular, battery modules are typically positioned in an unheated region of the aircraft. There may therefore be long periods of time where the batteries are exposed to very low ambient temperatures during flight, e.g. −40° C. or colder. Such low temperatures are not necessarily detrimental to the cells, but it may be important that the battery modules are ready for service at any time during the flight, and typically an optimal temperature range for battery operation is between 10° C. and 35° C. Thus despite their location, the temperature of the batteries is preferably maintainable at a level where power can be drawn from the cells. Accordingly, the coolant circuit may further have a heater to heat the pumped liquid coolant and thereby increase the temperature of the batteries, the heater and the heat exchanger being controllable such that the pumped liquid coolant is either cooled by the heat exchanger or heated by the heater.

The coolant circuit of the fifth aspect may conveniently be configured to control the pressure of the pumped liquid coolant to thereby control the pressure exerted on the major external surface of the batteries by expansion of the units. For example, the coolant circuit may have a fixed or variable orifice downstream of the collection port to maintain a controlled pressure in the pumped liquid coolant. Additionally or alternatively, the coolant circuit may have a pressure release valve in a bypass line across distribution and collection ports. In the event of over-pressure across the battery module, the pressure release valve can open to shunt pumped liquid coolant flow away from the module.

According to a sixth aspect of the present disclosure there is provided an electrical power supply system having: a DC distribution bus; a motor and a DC/AC converter which converts DC power absorbed from the DC distribution bus into AC power and delivers that AC power to the motor; and (i) the battery module according to the third aspect, or (ii) the combination according to the fifth aspect of the battery module and the coolant circuit, and a DC/DC converter operatively connected between the battery module and the DC distribution bus, wherein the battery module delivers DC power to the DC distribution bus in a discharge mode of operation, and absorbs DC power from the DC distribution bus in a recharge mode of operation.

The electrical power supply system may further comprise a generator and an AC/DC converter which converts AC power produced by the generator into DC power and delivers that DC power to the DC distribution bus.

According to a seventh aspect of the present disclosure there is provided an aircraft propulsion system having: the electrical power supply system according to the sixth aspect; and a propulsive fan or propeller which is powered by the motor.

The aircraft propulsion system may further comprise a gas turbine engine which powers the generator of the sixth aspect.

According to an eighth aspect of the present disclosure there is provided an aircraft having the propulsion system of the seventh aspect.

The skilled person will appreciate that except where mutually exclusive, a feature described in relation to any one of the above aspects may be applied mutatis mutandis to any other aspect. Furthermore except where mutually exclusive any feature described herein may be applied to any aspect and/or combined with any other feature described herein.

BRIEF DESCRIPTION OF THE DRAWINGS

Embodiments will now be described by way of example only, with reference to the Figures, in which.

DETAILED DESCRIPTION

Aspects and embodiments of the present disclosure will now be discussed with reference to the accompanying figures. Further aspects and embodiments will be apparent to those skilled in the art.

Figure 1:
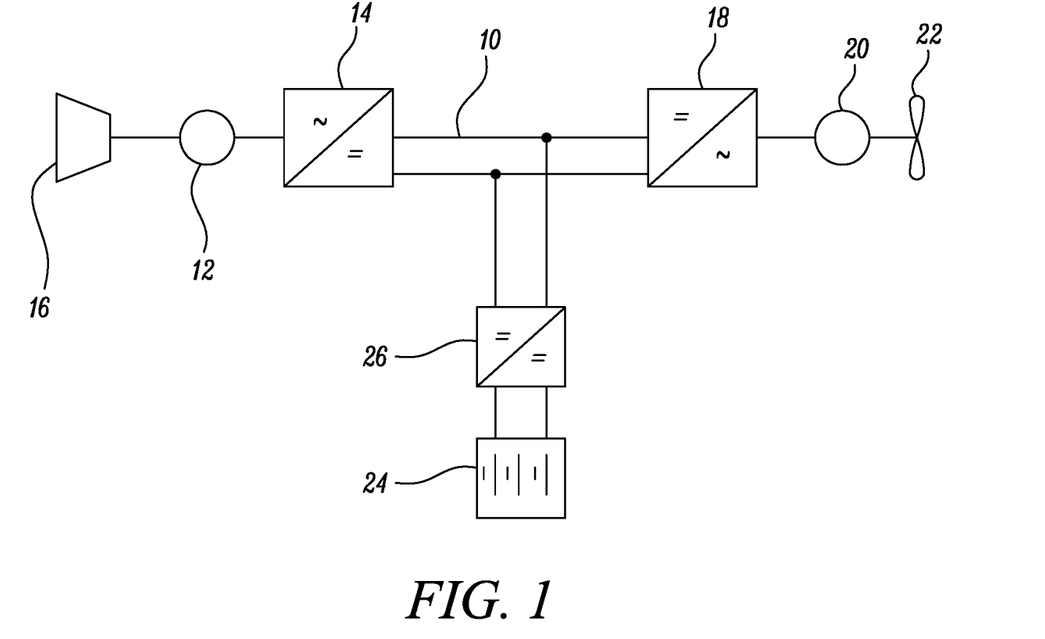
FIG. 1 shows schematically a hybrid electric aircraft propulsion system.

FIG. 1 shows schematically a hybrid electric aircraft propulsion system. The aircraft has a high voltage DC (HVDC) distribution bus 10. A generator 12 produces AC electrical power, which is converted to DC power by an AC/DC converter 14 for feeding into the bus. Conveniently, the generator can be powered by a gas turbine engine 16. Power is withdrawn from the bus by a DC/AC converter 18, which supplies the withdrawn power to a motor 20 and which in turn drives a propulsive propeller or fan 22 of the aircraft.

The propulsion system also has a stack of rechargeable, lithium ion battery modules 24. The modules are connected electrically in series to form a battery pack. The battery modules provide extra power at take-off, and more generally assist in the regulation of the voltage level in the HVDC distribution bus 10. The battery modules deliver DC power to the DC distribution bus in a power delivery mode of operation, and absorb DC power from the DC distribution bus in a power absorption mode of operation. A DC/DC converter 26 operatively connects the battery modules to HVDC distribution bus and helps the AC/DC converter 14 to maintain the voltage level of the bus at a fixed level.

Figure 2:
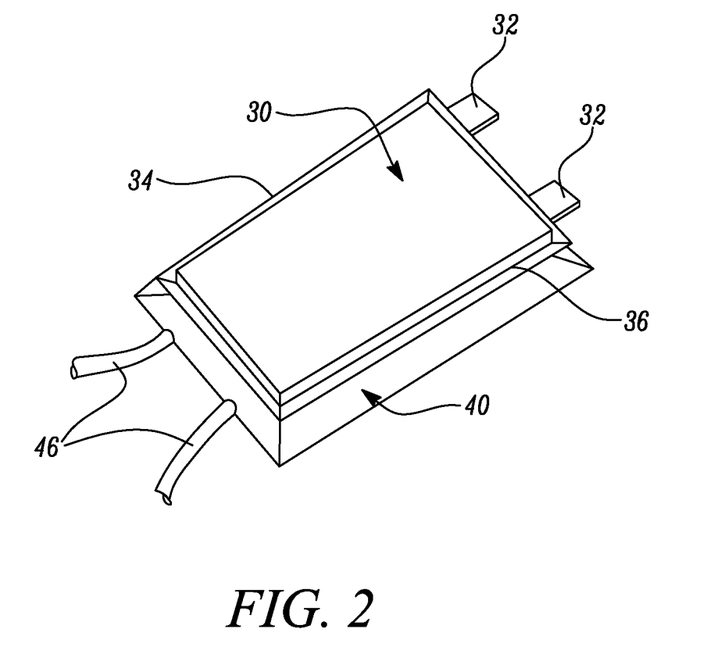
FIG. 2 shows a schematic perspective view, from a battery side, of a combination of a pouch cell battery and a thermal regulating unit in face-to-face contact.
Figure 3:
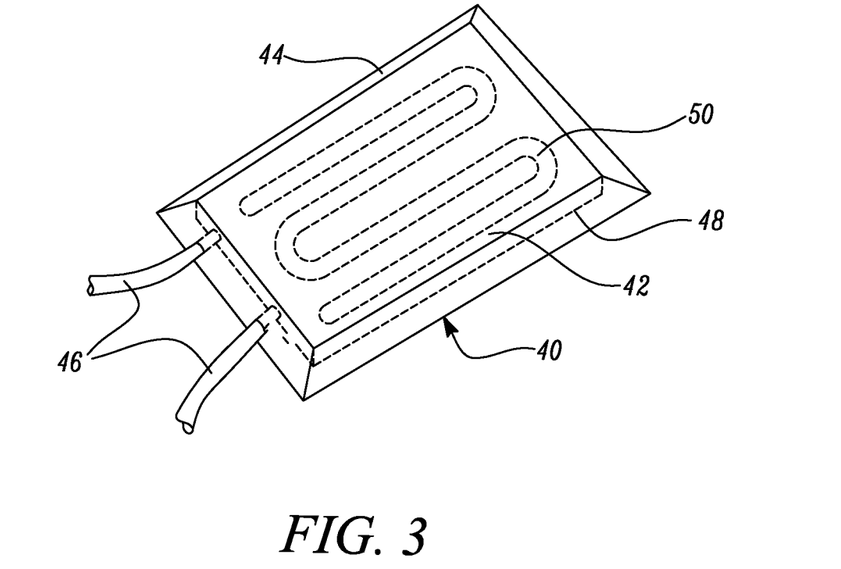
FIG. 3 shows a schematic perspective view of the combination of FIG. 2 from the thermal regulating unit side (pouch cell tabs not visible)

Each battery module 24 contains plural pouch cell batteries and plural thermal regulating units for the batteries. FIG. 2 shows a schematic perspective view, from a battery side, of a combination of one of these pouch cell batteries 30 and its thermal regulating unit 40 in face-to-face contact, and FIG. 3 shows a schematic perspective view of the combination from the unit side.

The battery 30 has electrical connection tabs 32 (which can both be at one end, as shown, or at opposite ends), and welded pouch side seams 34. The battery is substantially rectangular prismatic in shape and has two flat rectangular major external surfaces.

The thermal regulating unit 40 is formed as a bag-like container having a flexible outer covering 42, welded side seams 44, and inlet and outlet ports 46 for respectively providing liquid coolant (such as water, or water-glycol mixture, e.g. a 50:50 mixture) to and removing the liquid coolant from the unit. Filling the unit is a spacer element 48 in the form of a smooth edged, substantially rectangular prismatic body, shown schematically in perspective view in FIG. 4. This gives the unit a corresponding rectangular prismatic external shape, similar to that of the battery 30, including two rectangular major external surfaces, one of which is in face-to-face contact at an interface 36 with one of the rectangular major external surfaces of the battery 30. The spacer element is smooth edged to protect the outer covering 42, and contains cut-outs or recesses which define channels 50 for the coolant following a serpentine path from the inlet port to the outlet port. The element and the channels can be formed by die cutting, injection moulding, 3D printing, or other suitable process.

Figure 4:
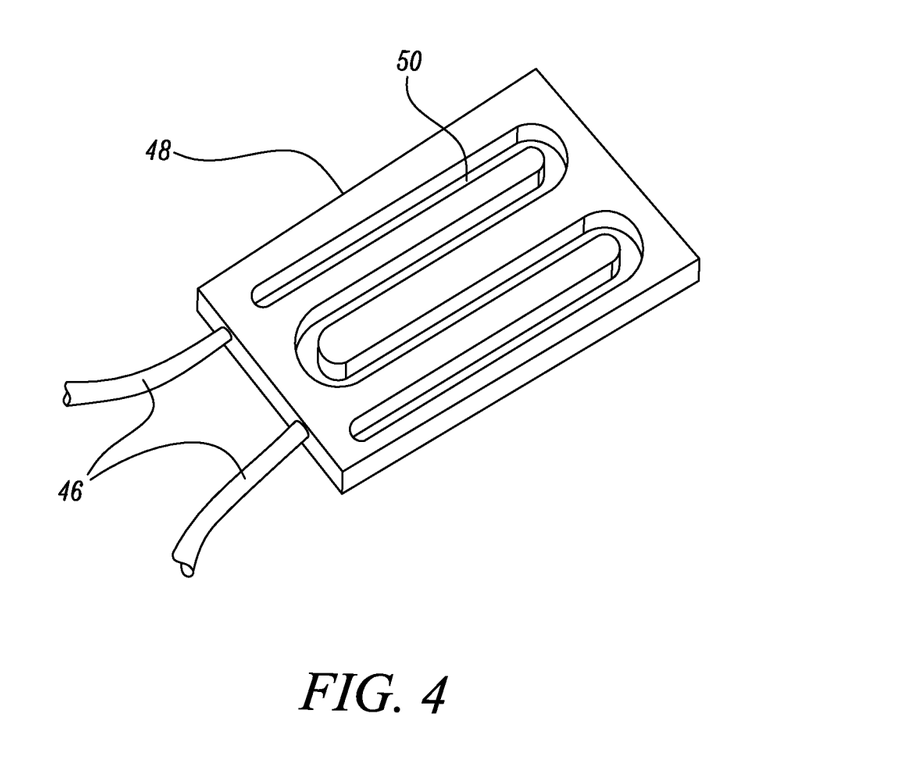
FIG. 4 shows a schematic perspective view of a spacer element which fills the thermal regulating unit of FIGS. 2 and 3.

Instead of the channels 50 following a serpentine path in the spacer element 48, other internal structures for guiding the flow of coolant liquid through the thermal regulating unit 40 and maintaining the shape of the unit with a flat major surface are possible. For example, an arrangement of internal baffles could be used.

The outer covering 42 can be formed of, for example, polyethylene, polypropylene, nylon or other suitable plastic film. It may be a multi-layer laminate, with or without reinforcement and impermeable barriers (such as aluminium foil). The spacer element 48 may likewise be formed of polyethylene, polypropylene, nylon or other suitable plastic resistant to the liquid coolant. Conveniently, the ports 46 can be provided by respective pieces of tubing which are preferably formed of the same material as the material of the outer covering for ease of joining (e.g. by welding) thereto, and which feed through the spacer element to the channels 50. When the tubing is fed through in this manner, the spacer element can retain a unitary structure which enhances the rigidity of the thermal regulating unit 40 as a whole. Once the tubing pieces are inserted through side holes in the spacer element, the flexible outer covering 42 can be welded (for example by radio frequency welding) along the seams 44 and around the tubing pieces.

The liquid coolant is pumped through the thermal regulating unit 40 by a coolant circuit (discussed below). This cools the battery 30 by heat transferred across the contact interface 36. In particular, as the areas of the contacting surfaces are relatively large, the thermal impedance between battery and the unit is reduced. The pumped coolant also pressurises the unit, causing the outer covering 42 to expand and press the unit against the battery across the interface, thereby further reducing the thermal impedance. The pressure exerted by the unit on the battery also helps to restrain the expansion of the battery in high altitude (low air pressure) environments, preserving cycle life.

The thickness of the material of the outer covering 42 is selected to provide adequate electrical isolation of the liquid coolant from the surface of the battery 30. For electrical systems where the HVDC bus voltage approaches 1 kV, a covering formed of plastic film having a thickness of 0.2 mm to 0.5 mm plastic may be sufficient; plastic films typically having insulation ratings of about 20 kV/mm. On the other hand, the covering must be sufficiently thin to allow sufficient heat to pass therethrough, from the battery to the liquid coolant. Typical plastic films have thermal conductivities of between 0.2 to 0.5 W/mK.

When determining the thermal resistance between the cell electrode stack within the battery 30 and the liquid coolant, the composition of the pouch cell material can also be considered. Commercial pouch cell laminates typically have multiple layers. For example, an inner layer may be composed of polypropylene (20-40 µm), a middle layer of aluminium foil (5-30 µm) and an outer layer of nylon 6 (10-40 µm), although materials and laminates configurations may be substituted. Various adhesive layers may also be present to bind the laminates but these are thin and do not significantly affect the thermal performance of the laminate.

The effectiveness of cooling across the interface 36 can be readily estimated. For example, if the interfacial area is 10 cm×20 cm, the thickness of the material of the outer covering is 500 µm, the thickness of the pouch material is 80 µm, and the thermal conductivities of the outer covering material and the pouch material are both 0.4 W/mK, then the effective thermal resistance R between the cell electrode stack and the liquid coolant can be estimated as:

$$R=((80+500)\cdot 10^{-6})/(0.4*0.1*0.2)=0.07 \text{ K/W}$$

In this example the estimated thermal resistance is quite low and suggests that it may be possible to increase the thickness of the outer covering material so as to improve upon electrical isolation, water permeation resistance and water pressure withstand resistance.

The thermal regulating unit 40 provides a flat major external surface at the interface 36 so that the unit exerts an even pressing force against the battery 30 which does not deform the cell electrode stack within.

Additional films may be placed between the battery 30 and the unit 40. These may serve various functions such as
  accommodating irregularities in the surfaces at the interface 36;
  spreading the heat across the interface; and
  adhering the unit 40 to the battery 30 across the interface.
Thermally conductive grease may also be applied to fill microscopic voids at the interface 36.

Figure 5:
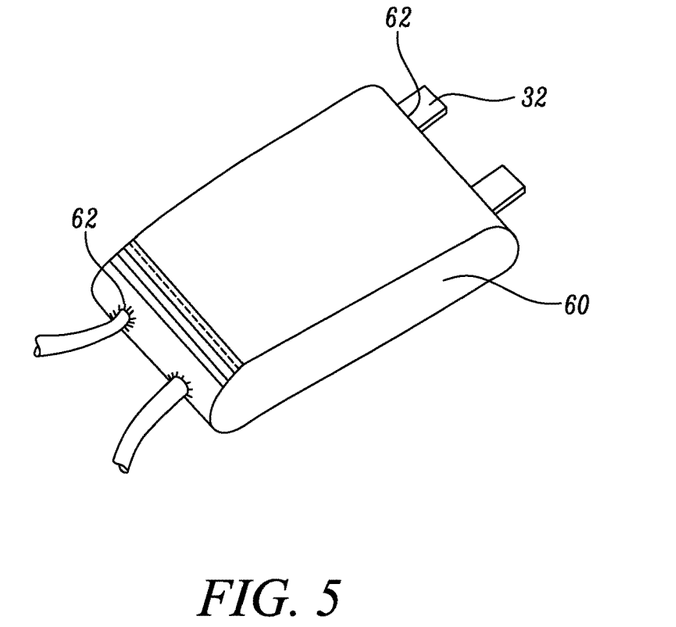
FIG. 5 shows a schematic perspective view of the combination of the pouch cell battery and the thermal regulating unit of FIGS. 2 and 3 inserted into a restraining jacket.

As shown schematically in FIG. 5, the combination of the pouch cell battery 30 and the thermal regulating unit 40 is inserted into a close-fitting, sewn, restraining jacket 60 formed from non-combustible inorganic fibre material, such as felt. Eyelets 62 are sewn into the envelope to allow the tabs 32 and the inlet/outlet ports 46 to pass out of the jacket.

The inorganic fibres may be alumina-silicate ceramic fibre, which has very high temperature withstand capability, and can be used continuously at up to 1260° C. The jacket 60 provides a non-combustible thermal barrier around the battery 30 and the unit 40. It also helps to mechanically protect the battery and unit and keep them in close contact. In the event of electrolyte venting from the battery or thermal runaway, the ceramic fibres do not prevent the release of vapour and smoke. These will pass through the material to an air plenum (void space) above the cells, as described below.

Figure 6:
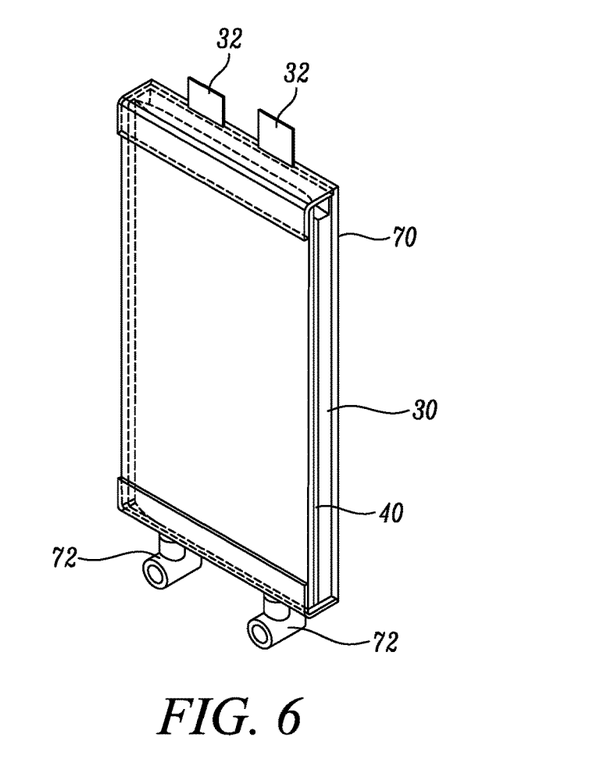
FIG. 6 is a transparent perspective view of a pair combination of a pouch cell battery and a thermal regulating unit from a battery module.
Figure 7:
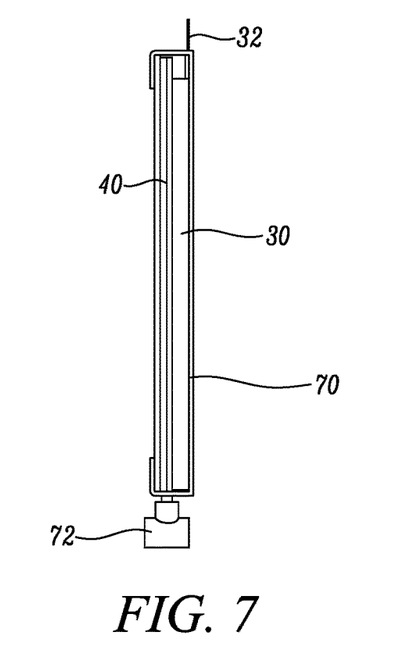
FIG. 7 is a cross-sectional side view of the pair combination of FIG. 6.
Figure 8:
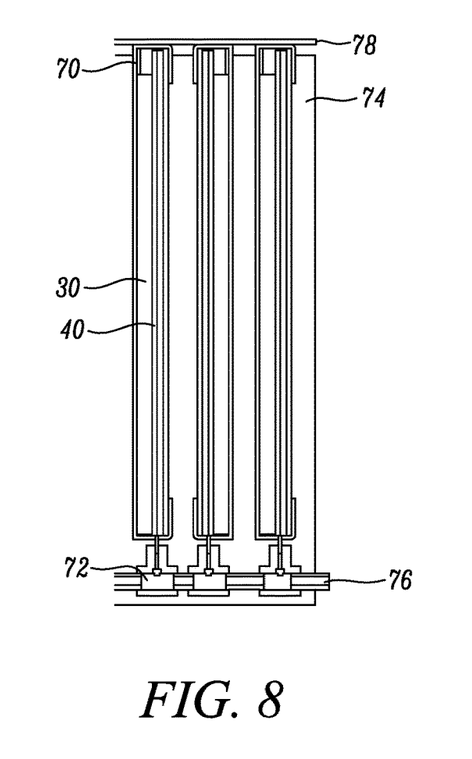
FIG. 8 is a cross-sectional side view of three aligned pair combinations of a pouch cell battery and a thermal regulating unit from the battery module.
Figure 9:
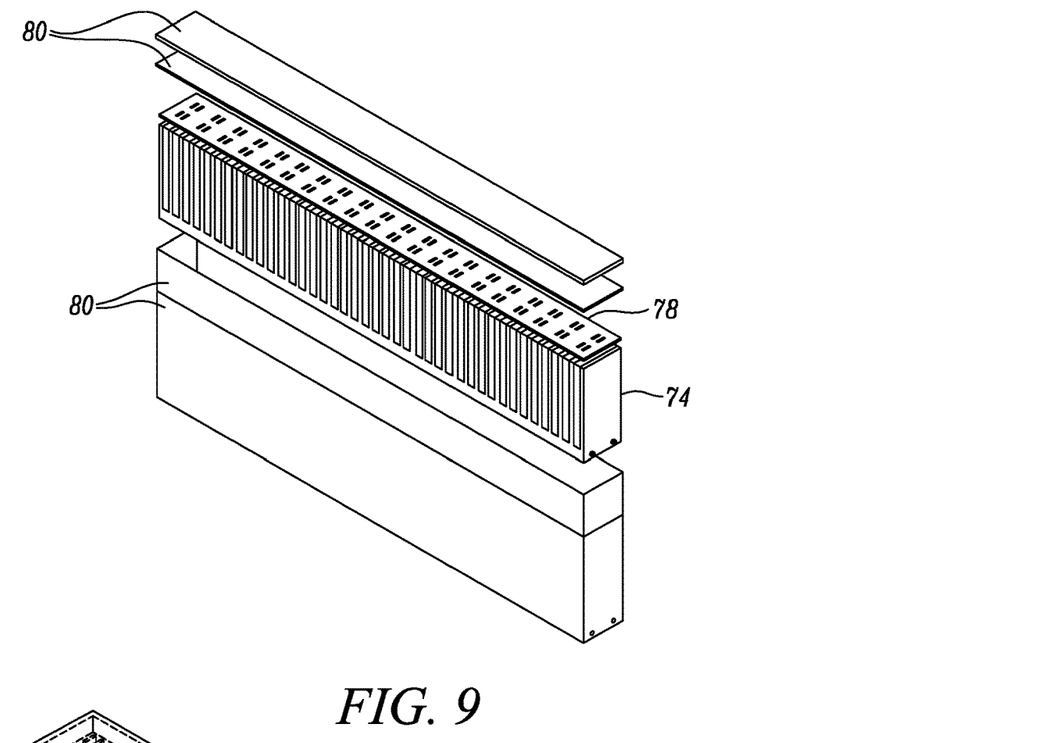
FIG. 9 is an exploded view of the battery module.
Figure 10:
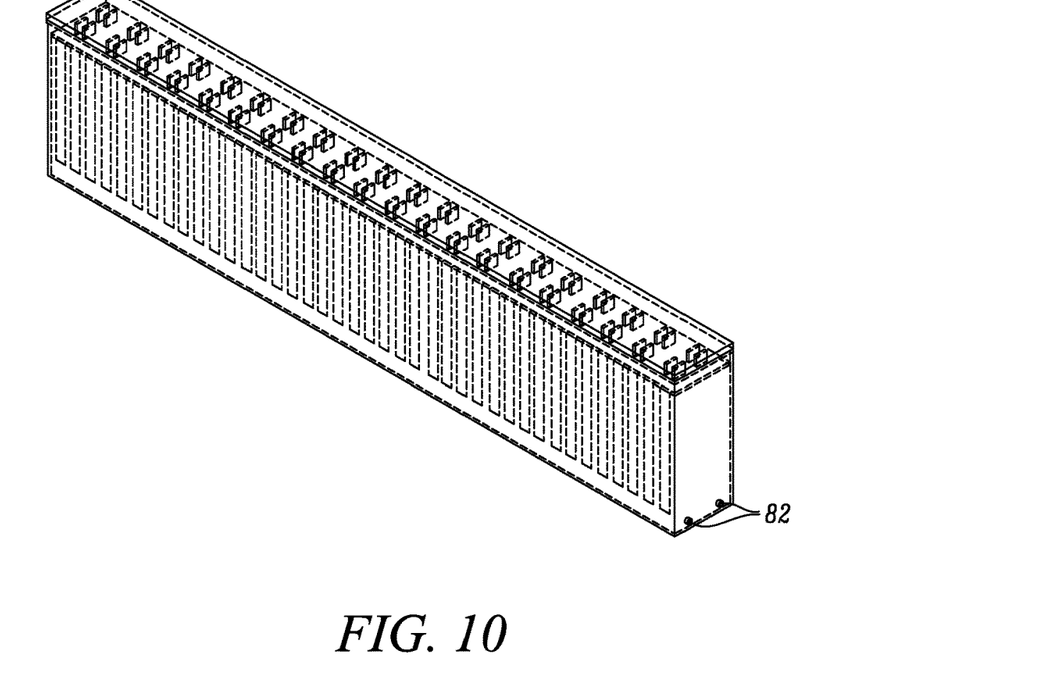
FIG. 10 is a transparent perspective view of the finally assembled battery module.

The battery module 24 contains plural battery/unit pair combinations, each in its own jacket 60 and each mounted in a light scaffold placed within a casing, the battery/unit pair combinations and scaffold being encapsulated with form-in-place fire retardant polyurethane foam. FIG. 6 is a transparent perspective view and FIG. 7 a cross-sectional side view of one such pair combination, the views also showing the respective portion of scaffolding 70, and connectors 72 for the inlet/outlet ports 46. FIG. 8 is a cross-sectional side view of three such aligned pair combinations, and also shows the encapsulating foam 74, piping 76 joining the connectors 72, and a portion of a printed circuit board (PCB) 78 which electrically connects the tabs 32. FIG. 9 is an exploded view of the module, showing a complete row of aligned battery/unit pair combinations of the module encapsulated in the foam 74, the PCB 78 and parts of a casing 80 for the module. FIG. 10 shows a transparent perspective view of the finally assembled module, and also shows distribution and collection ports 82 for the piping 76, the ports allowing the liquid coolant to respectively enter and leave the casing.

The foam 74 may possess phosphate based flame retardant, such as Swiftbond™ 4006BFR 'Flame Retardant Encapsulation Foam' containing 20-30% retardant, manufactured by H. B. Fuller. Such foam does not sustain combustion in normal atmosphere and is rated UL94 HBF at 3.2 mm and UL94 VO at 6.35 mm. The foam also has a low viscosity before setting, allowing for intricate parts to be encapsulated. In addition, the foam is electrically insulating, e.g. with an insulation rating of 3 kV/mm. Thus, suspending the batteries 30 within the foam helps to electrically isolate them and the electrical system from the casing 80 and coolant system which are at ground potential.

A further function of the foam 74 is to securely but gently fix the battery/unit combinations in place. As the foam expands it collapses voids in the fibrous jacket 60 and presses the thermal regulating units 40 against their batteries 30. As mentioned above, such pressure improves the thermal contact between units and the batteries, and also helps maintain cell capacity in high altitude environments.

The foam 74 also fills the module casing 80, enhancing the rigidity of the casing and removing air space within the casing, except for a small void above the tabs 32. When the volume of free space is decreased within the module 24, the severity of explosions that may occur within the module due to ignition of electrolyte vapour is reduced, and routes for air to enter into module and support the fire are reduced. Decreasing the free space also increases the probability that any explosions proceed as deflagrations rather than detonations (which give rise to higher pressure waves that are more difficult to contain).

However the void (air plenum) above the tabs 32 can:
  Provide a venting space in case of electrolyte discharge;
  Act as a manifold to collect gas/smoke in case of thermal runaway;
  Channel gas/smoke from the module casing 80 to the outside through a burst valve (not shown) located on a wall of the casing;

Provide space for components and activities such as a bus bar, welding of a bus bar, a PCB, connectors and sensors which are connected/performed after the batteries are fixed in place by the foam 74.

Figure 11:
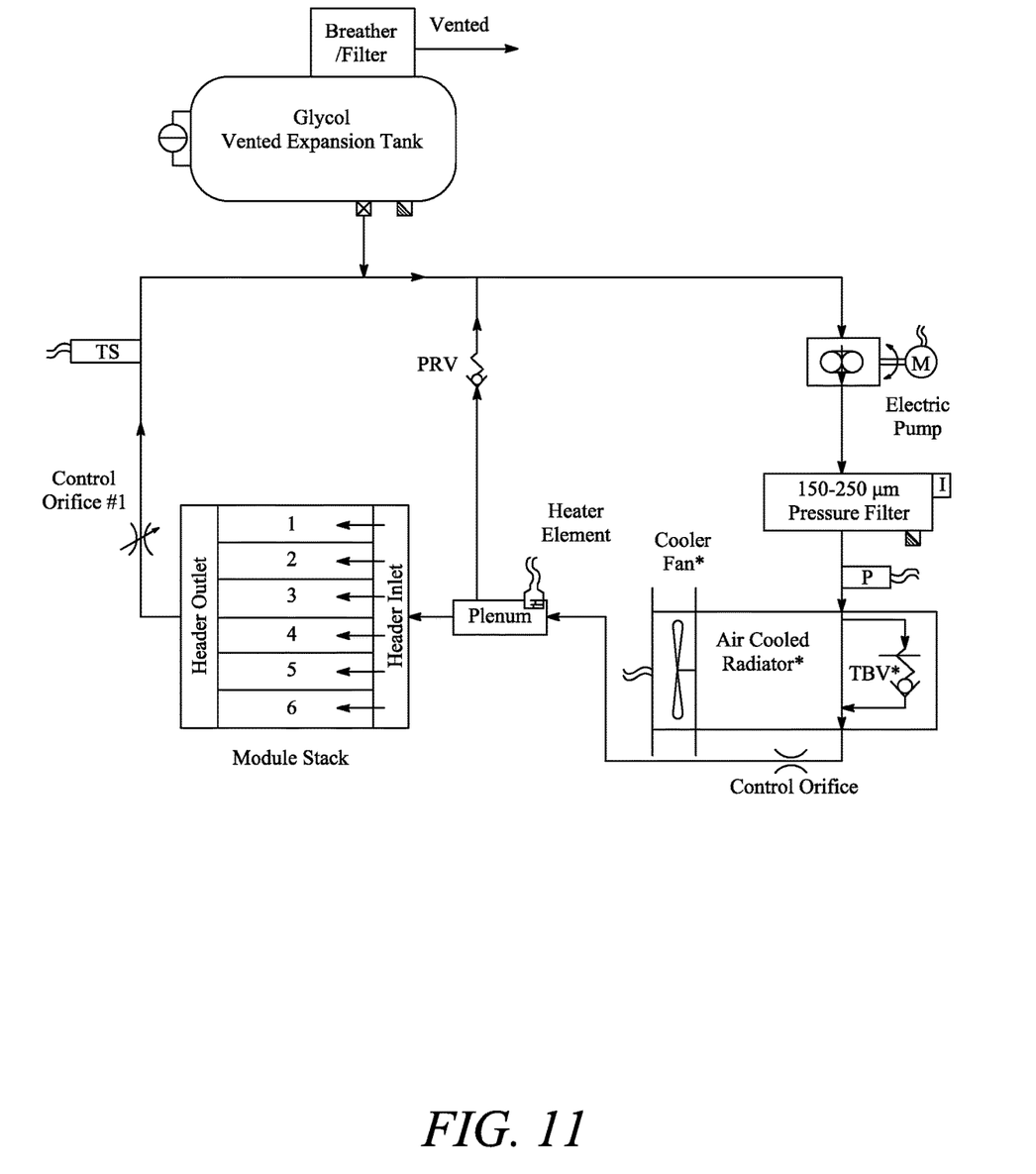
FIG. 11 shows schematically a stack of six of battery modules in a circuit for a liquid coolant.

FIG. 11 shows schematically a stack of six of the modules 24 in a circuit for the liquid coolant. The circuit has a header inlet which sends coolant to the distribution ports of the modules, and a header outlet which receives coolant from the collection ports of the modules. The circuit also has electric pump for circulating the coolant around the circuit, and a heat exchanger based on a radiator and cooler fan to reduce the temperature of the pumped coolant and thereby remove waste heat from the modules. A thermal bypass valve (TBV) operates to allow the coolant to bypass the heat exchanger when the coolant is at or below a predetermined temperature. In addition, the circuit has a heater element which can heat the coolant in a plenum before entry into the header inlet, the heater and the heat exchanger being controllable such that the coolant is either cooled by the heat exchanger or heated by the heater. In this way, an option is available to warm the batteries. In particular, battery modules are typically positioned in an unheated region of the aircraft, and there may therefore be long periods of time where the batteries are exposed to very low ambient temperatures during flight when the batteries are not in use. The heater can thus heat the coolant and keep the batteries in an optimal temperature range of 10° C. and 35° C. ready for immediate operation.

The circuit has a pressure release valve (PRV) across the module stack. In the event of over-pressure across the modules, the PRV opens and shunt coolant flow away from the modules. As the outer coverings 42 of the thermal regulating units 40 are formed from plastic sheet, their pressure withstand capability is relatively low. The PRV thus provides a means to prevent coolant over-pressure that may damage the units.

However, it is desirable to keep maintain a slight pressure within the units 40 during operation. The back pressure helps to expand the units and keep them pressed against the batteries 30. This may be achieved by providing a fixed or variable control orifice in the circuit downstream from the module stack.

The circuit has a temperature sensor (TS) and a pressure sensor (P) to allow for health monitoring and feedback control of the various functions discussed above.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

The invention claimed is:

1. A thermal regulating unit for regulating the temperature of a pouch cell battery, the thermal regulating unit being formed as a container having:
   a spacer element which substantially completely fills the unit and includes one or more internal cooling channels for conveying a liquid coolant through the unit;
   a flexible outer covering which contains the spacer element and the one or more internal cooling channels; and
   inlet and outlet ports which penetrate the flexible outer covering for respectively providing liquid coolant to and removing the liquid coolant from the one or more internal cooling channels; wherein
   the flexible outer covering forms a substantially flat major external surface of the unit for pressing against a major external surface of the pouch cell battery such that the unit and the pouch cell battery can be held in face-to-face contact;
   the spacer element and the one or more cooling channels are arranged in the flexible outer covering such that when the liquid coolant is pressurized, the liquid coolant causes the unit to expand and press against the major external surface of the pouch cell battery, the spacer element limiting the expansion of the unit; and
   the container is a bag-like container and the flexible outer covering forms an outer surface of the bag-like container.

2. The thermal regulating unit according to claim 1, wherein the flexible outer covering is formed of a plastic material having a thermal conductivity of at least 0.2 W/mK.

3. The thermal regulating unit according to claim 1, wherein the cooling channels follow a serpentine path from the inlet port to the outlet port.

4. The thermal regulating unit according to claim 1, wherein the cooling channels are cut-outs through or recesses in a body of the spacer element.

5. The thermal regulating unit according to claim 1, wherein the substantially flat major external surface of the thermal regulating unit corresponds in shape to the major external surface of the pouch cell battery.

6. A battery module having:
   plural thermal regulating units according to claim 1; and
   plural electrically connected pouch cell batteries, each cell battery having a major external surface corresponding in shape to the major external surface of a respective one of the units;
   wherein each pouch cell battery forms a battery/unit combination with the respective one of the units such that the major external surfaces of the battery and the respective one of the units are in face-to-face contact.

7. The battery module according to claim 6, wherein each battery/unit combination is contained in a respective restraining jacket formed of non-combustible material.

8. The battery module according to claim 7, wherein the non-combustible material is an inorganic fibre material.

9. The battery module according to claim 6, wherein battery/unit combinations are arranged within a casing, spaces within the casing surrounding the battery/unit combinations being filled with flame-retardant and electrically-insulating expanded foam.

10. The battery module according to claim 9, retaining a void for collection of gas and smoke from the batteries in the event of thermal runaway of one or more of the batteries, and for channeling the collected gas and smoke to a burst valve located in the casing.

11. The battery module according to claim 9, wherein the casing has a distribution port penetrating therethough which is fluidly connected to the inlet ports of the thermal regulating units, and a collection port penetrating therethough which is fluidly connected to the outlet ports of the thermal regulating units, wherein the liquid coolant can enter and leave the casing via respectively the distribution and collection ports.

12. A combination of the battery module according to claim 11, and a coolant circuit, wherein the coolant circuit has a pump to pump the liquid coolant from the collection port back to the distribution port via a heat exchanger to reduce the temperature of the liquid coolant that is pumped and thereby remove waste heat from the battery module.

13. The combination according to claim 12 of the battery module and the coolant circuit, wherein the coolant circuit further has a heater to heat the liquid coolant that is pumped and thereby increase the temperature of the batteries, the heater and the heat exchanger being selectably controllable such that the liquid coolant is either cooled by the heat exchanger or heated by the heater.

14. The combination according to claim 12 of the battery module and the coolant circuit, wherein the coolant circuit is configured to control the pressure of the liquid coolant that is pumped to thereby control the pressure exerted on the major external surface of the batteries by expansion of the units.

15. An aircraft propulsion system including (i) the battery module according to claim 6.

16. The aircraft propulsion system of claim 15, further comprising an electrical distribution bus; a motor; and a propulsive fan or propeller which is powered by the motor, wherein the battery module delivers power to the electrical distribution bus, and wherein the electrical distribution bus delivers power to the motor.

17. An aircraft comprising the aircraft propulsion system according to claim 15.

\* \* \* \* \*